350-433
E297A
SR
XR 3,670,145

United Sta
Allais

[15] 3,670,145
[45] June 13, 1972

[54] TAPE FEED SYSTEM

[72] Inventor: David C. Allais, Edmonds, Wash.

[73] Assignee: Interface Mechanisms, Inc., Mountlake Terrace, Wash.

[22] Filed: Dec. 9, 1970

[21] Appl. No.: 96,444

[52] U.S. Cl. ................235/61.11 E, 226/84, 179/100.2 MP, 250/219 D
[51] Int. Cl. ..................................G03b 1/24, G06k 13/05
[58] Field of Search .........................179/100.2 MP, 100.3 L; 250/219 F, 219 ID; 226/80, 84, 89, 90, 51, 153; 235/61.11 E

[56] References Cited

UNITED STATES PATENTS

| | | | |
|---|---|---|---|
| 3,439,852 | 4/1969 | Blodgett | 226/84 |
| 3,430,033 | 2/1969 | Reed | 235/61.11 E |
| 3,315,083 | 4/1967 | Bushnell | 250/219 ID |
| 2,792,175 | 5/1957 | Amundsen | 235/61.11 E |
| 2,493,056 | 1/1950 | Bartelson | 179/100.3 L |
| 3,351,744 | 11/1967 | Masterson | 235/61.11 E |
| 3,397,290 | 8/1968 | Thomson et al | 179/100.2 MP |

*Primary Examiner*—Thomas A. Robinson
*Attorney*—Christensen & Sanborn

[57] ABSTRACT

A tape feed system together with an optical reader for reading data from the tape. A drive capstan having inner and outer flanges defining a tape holding region is driven by a step motor. One of the flanges is spring-loaded so that the tape is gripped between the two flanges. Spring-loaded tape guide devices located above and below the center of the capstan each have idler wheels urging the tape against the capstan in an arrangement such that the tape passes around substantially more than 90° of the capstan. A cylindrical lens and light source provides light in a slit pattern on the flat surface so that high intensity light is reflected to the reader for reading data from the tape.

8 Claims, 5 Drawing Figures

INVENTOR,
DAVID C. ALLAIS
BY
Christensen & Sanborn
ATTORNEYS

INVENTOR,
DAVID C. ALLAIS
BY
Christensen & Sanborn

ATTORNEYS

TAPE FEED SYSTEM

In the art of reading perforated or printed tapes a typical problem encountered is that associated with flutter of the tape and lack of accurate registration as the tape passes the reading station. In the case of optical readers it is important to have an arrangement wherein the tape is held against movement toward or away from the lens assembly, since typically the optical readers will have a focal plane coincident with the plane of the section of tape being read. This has led to many known physical arrangements wherein the tape feed apparatus and reading assembly requires a substantial length of tape feed path in order to permit forward and reverse feeding of the tape with the tape being maintained under tension as it passes through the read station. It would be advantageous to have a compact tape feed apparatus together with a tape reader such as exemplified by an optical reader utilizing photo diodes.

It is therefore an object of the present invention to provide a compact optical reader and tape feed assembly associated therewith.

Another object of the present invention is to provide an improved tape feed assembly for feeding a printed tape in forward and reverse directions past a read station.

Another object of the present invention is to provide a compact tape reader and tape feed assembly.

In accordance with the teachings of the present invention the tape to be read passes around a driven capstan with idler wheels engaged with the tape to press the tape against the capstan. These wheels thus hold the tape against movement relative to the capstan as the tape passes a read station located on the circumference of the capstan between the idler wheels. A cylindrical lens focuses light from an elongated filament in a light source in a slit pattern on the section of tape passing the area defined as the read station. A second lens assembly focuses light from the read station onto a plurality of photo diodes so that output signals dependent on the presence or absence of markings on the tape will be provided. A spring-loaded flange on one end of the capstan grips the tape to the capstan by forcing the tape against a second flange carried on the opposite end of the capstan. The tape path is defined by the two flanges. Stripping fingers engaged with circumferential slots in the capstan serve to prevent adherence of the tape to the capstan and to facilitate easy initiation of tape feed by the insertion of an end of the tape beneath the idler wheels.

The above and further advantages of the invention will be more clearly understood from the following description when read with reference to the accompanying drawings.

Figures 1, 2:
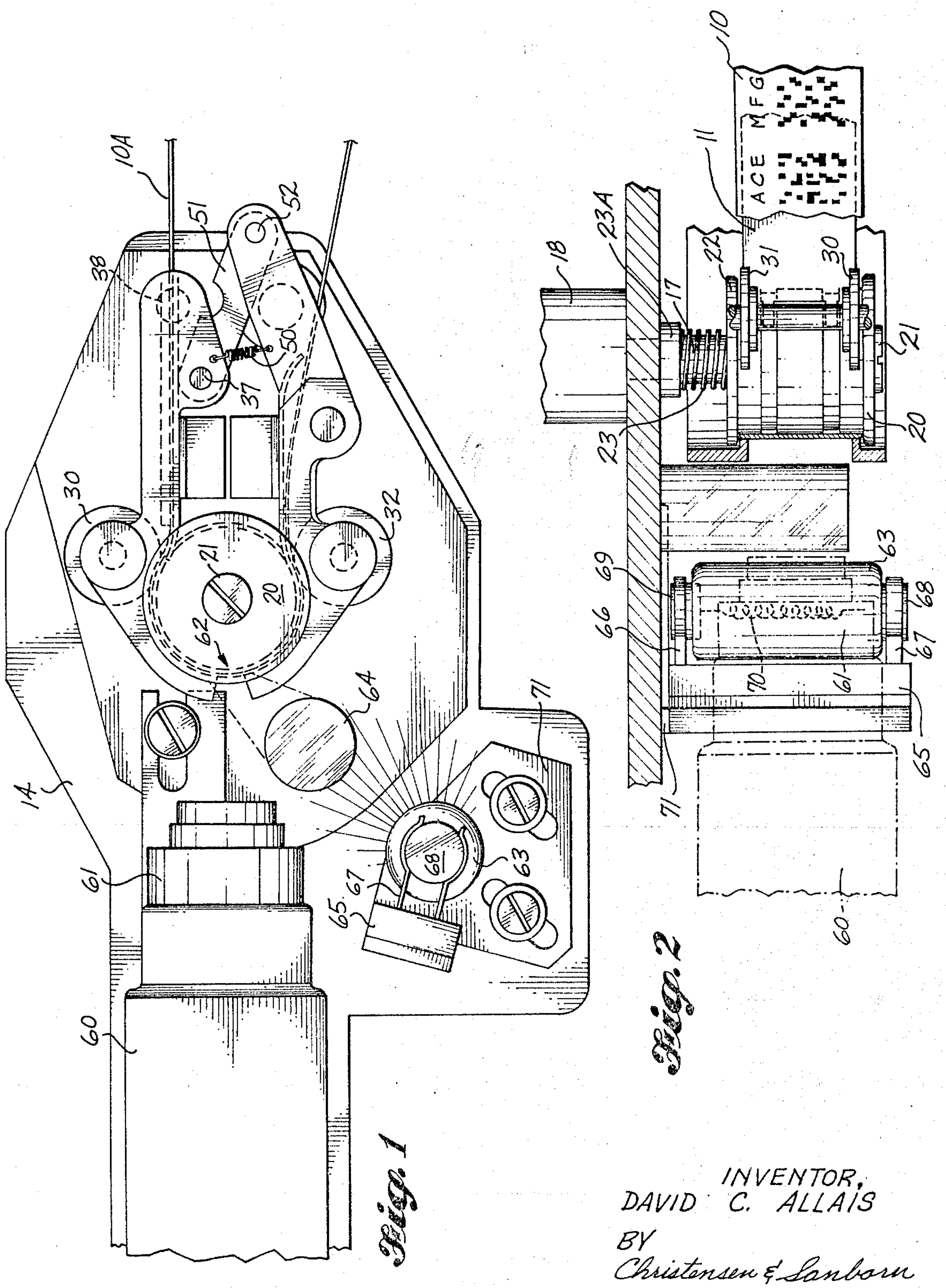
FIG. 1 is an elevation view showing the arrangement of parts for one system mounted on a vertical support plate.
FIG. 2 is a top view looking down on the assembly of FIG. 1 with the reader shown in dotted lines.
Figures 3, 4, 5:
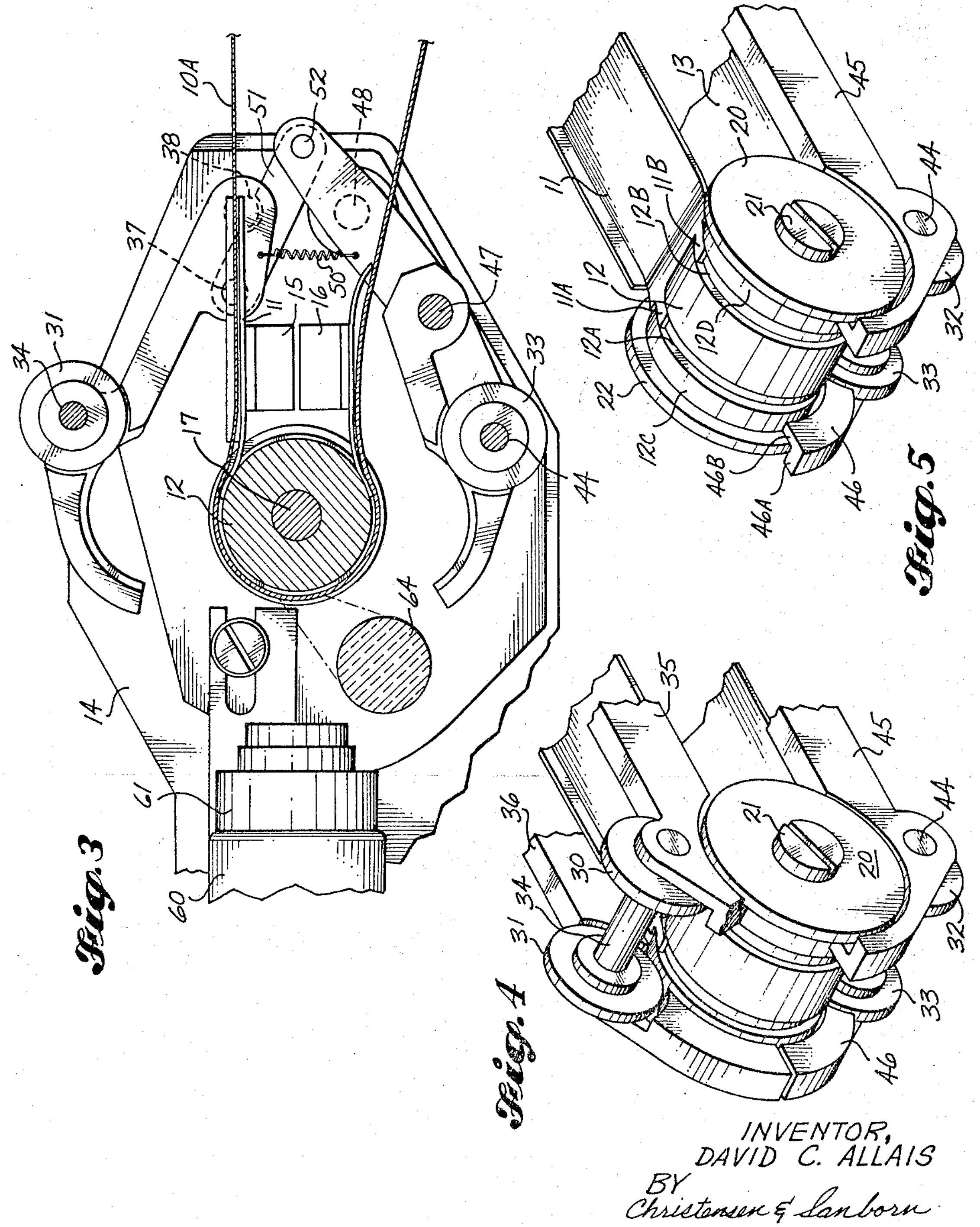
FIG. 3 is a view similar to FIG. 1 with certain components in cross section and illustrating the tape holding members in their opened positions.
FIG. 4 is an enlarged perspective view of the capstan and tape holding assemblies with portions of one tape holding assembly broken away.
FIG. 5 is an enlarged perspective view of the capstan and one holding assembly together with the upper stripping plate.

Turning now to the drawings and in particular to FIG. 1, the preferred embodiment of the invention is shown in a system adapted for reading a printed tape 10 which has alpha information thereon together with printed code patterns located beneath the alpha designations. As best seen in FIGS. 1 and 3 the upper section of tape 10A passes along the top of the upper stripping plate 11, around the capstan 12, and then leads away from the capstan 12 over the lower stripping plate 13 which is similar in construction to the upper stripping plate 11. A vertical frame 14 supports the various components with the stripping plates 11 and 13 being supported by the support blocks 15 and 16 which are secured to the support frame 14. The capstan 12 is secured to the drive shaft 17 of the stepping motor 18 which is driven in step-wise fashion for either forward or reverse feeding of the tape 10. The capstan 12 is preferably made of a plastic material and is provided with circumferential slots 12A and 12B which are adapted to receive the stripping fingers 11A and 11B of the upper stripping plate 11. The lower stripping plate 13 has similar stripping fingers (FIG. 1) which ride in the circumferential grooves 12A and 12B.

An outer tape holding flange 20 is held to the outer end of the capstan 12 by the screw 21 having an enlarged head. The screw 21 is threaded into the end of the shaft 17.

An inner tape flange 22 is disposed about the shaft 17 and is urged against the inner end of the capstan 12 by means of the coil spring 23 disposed between the inner side of the flange 22 and the collar 23A. The arrangement is such that due to the yielding urge of the spring 23 holding the inner flange 22 against the inner end of the capstan 12 the tape 10 is gripped between the flanges 22 and 20.

The tape is held against the capstan by means of the four small discs or wheels 30, 31, 32 and 33. These wheels are aligned with the outer cylindrical portions 12C and 12D of the capstan 12. The upper wheels 30-31 are supported for rotation on the shaft 34 carried by the outer ends of the tape guide arms 35 and 36. Guide arms 35 and 36 are interconnected by the pin 37 and are pivoted on the pivot shaft 38 extending outward from the support frame 14. As best seen in FIG. 3, the ends of the tape guide arms most remote from the pivot shaft 38 are semi-circular and adapted to mate with the circumference of the capstan in the area of the surfaces 12C and 12D.

The lower wheels 32 and 33 are similarly supported on the shaft 44 carried near the outer ends of the lower tape guide arms 45 and 46 which are interconnected by the pin 47 and supported for rotation on the support pin 48 carried by the support frame 14. The outer ends of the tape guide arms 35, 36, 45 and 46 are the same and are best illustrated in FIGS. 4 and 5. Therein it will be seen that the arm 46 has an arcuate portion 46A which is disposed about the inner flange 22. The portion 46B of the tape guide arm 46 is aligned and held immediately adjacent to the capstan surface 12C but is spaced from the surface 12C by a distance which is slightly greater than the thickness of the tape 10. The spacing is determined by the engagement of wheel 33 which holds the tape against the capstan and also holds the tape guide arm away from the capstan. The ends of the other tape guide arms are substantially identical to the end of tape guide arm 46 with each of the ends being held away from the capstan by the wheels so that only the wheels engage the tape and hold the tape against the capstan 12.

A coil spring 50 interconnects the tape guide arms and continuously urges the tape guide arms toward the capstan 12. A toggle link 51 interconnects the upper and lower sets of tape guide arms by being connected to the pins 37 and 52 respectively carried by the upper and lower sets of guide arms so that when an operator moves one of the sets of guide arms away from the capstan the other set of guide arms is also moved away from the capstan. The parts are shown in FIG. 1 in their positions of holding the tape against the capstan and in their positions in FIG. 3 of being disengaged from the tape.

The tape reader is illustrated generally at 60 and includes a lens assembly 61 which is focused on a line of print on the tape 10 held against the capstan 12 at the read station 62. The lens assembly 61 focuses light from the read station 62 onto a matrix of photosensitive elements which are themselves per se well known in the art. Light from an elongated electric light bulb 63 is focused on the read station 62 by the cylindrical lens 64. The bulb holder 65 has pairs of electrical spring contacts 66 and 67 which hold the conductive end caps 68 and 69 for the bulb 63. The arrangement is such that the filament 70 of the bulb 63 is accurately positioned so that the lens 64 effectively focuses the filament 70 on the read station 62 and hence provides an intense slit of light in the focal plane of the lens assembly 61 of the reader. In the particular embodiment of the invention illustrated, the lens 64 is a cylinder of glass or clear plastic supported by the frame 14. A split lens made from two separated halves of a right circular cylindrical lens such as illustrated in FIGS. 1 and 2 could as readily be used to focus the filament 70 for the production of a slit of intense light in the focal plane of the lens assembly 61 at the read station 62. It will be seen that the bulb 63 can be adjusted relative to the frame 14 by means of the auxiliary plate 71 which carries the bulb 63. The plate 71 is held to frame 14 by means of the screw and slot assemblies illustrated in FIG. 1.

In using the apparatus it is not necessary to open the tape guide arms (i.e., move them away from their FIG. 1 to their FIG. 3 positions) in order to load the tape. The operator need only take the end of the tape and run it along the upper surface of the upper tape guide 11 and under the upper wheels 30 and 31 and then actuate the stepping motor 18 so that the capstan 12 will be rotated counterclockwise. The capstan 12 is preferably made of a material such as urethane. The end of the tape is readily trapped beneath the wheels 30-31, and hence as the capstan rotates the tape will be guided by the ends of the guide arms 35–36 and 45–46 so that the tape becomes trapped between the lower wheels 32–33 and the capstan and hence continues on around the capstan and exits along the lower surface of the lower guide plate 13. Thus in the case of a non-continuous tape the tape is easily loaded by simple insertion of one end in the manner described.

In the case of a closed loop of tape the guide arms are opened to the positions illustrated in FIG. 3 and the tape is positioned about the capstan 12. The guide arms are then returned to their operating positions, and the equipment is ready for the reading of data from the tape. In each instance it will be observed that due to the yieldable inner flange 22 and the pressure exerted by the guide wheels, the tape is firmly held against the capstan 12 with the edges of the tape being gripped by the flanges 20 and 22 so that once the tape is loaded it is held flat against the capstan and always moves with the capstan. Thus using the apparatus of the present invention a stepping motor is all that is required for accurate tape movement and the usual tape brake assemblies are not required. It will be noted that the tape is engaged with more than 90° of the circumference of the capstan. It has been found in practice that with the frictional forces thus involved, there is little tendency for the tape to move relative to the capstan and it is also found that the section of the tape being read lies in the focal plane of the lens assembly 61, and hence accurate images are provided on the photocell matrix in the reader 60. The system has been found to permit forward and reverse feeding and reading of the tape at high speeds, and thus an accurate and compact tape feed and tape reading system is provided.

While the invention has been described by reference to the presently preferred embodiment, it will become obvious to persons skilled in the art that changes can be made without departing from the inventive concepts. For example, the tape guide arms need not necessarily be interconnected in pairs in the manner indicated. It is intended that such changes and modifications as become obvious to a person skilled in the art from the teachings hereof will be encompassed by the following claims.

What is claimed is:

1. A tape reader comprising in combination: cylindrical capstan means supported for rotation and having a toothless tape support surface means thereon; drive means for rotating said capstan means; tape guide means positioned adjacent said capstan means and directing tape toward the said tape support surface thereof; first and second tape guide arm means having arcuate tape guide surfaces adapted for positioning adjacent said capstan means, said arm means being pivotally supported for selective movement of said arcuate surfaces toward and away from opposite portions of said capstan means; first and second roller means respectively carried by said guide arm means and aligned for engagement with the tape support surface of said capstan means, said arcuate surfaces each extending greater than 45° around said capstan means from where said roller means are mounted; spring means urging said arm means toward said capstan means with said roller means adapted to engage and hold tape against said capstan means; and means defining a read station adjacent said tape support surface means including tape reading means aligned with said capstan between said roller means, said read station being located adjacent said arcuate surfaces.

2. The apparatus of claim 1 wherein said tape read means includes an optical reader having first lens means focused on a first plane located at said read station, and further including a light source and second lens means focusing light in a slit pattern on said plane at said read station.

3. The apparatus of claim 1 wherein said capstan means has first and second depressed circumferential grooves, and stripper means including first and second plates having a width corresponding substantially to the width of said tape support surface means and having elongated portions disposed in said grooves.

4. The apparatus of claim 2 wherein said second lens means is in the shape of a right circular cylinder.

5. The apparatus of claim 3 wherein said first roller means includes first and second spaced rollers respectively aligned with the opposite outer ends of said tape support means with said grooves located therebetween, and said second roller means includes third and fourth spaced rollers respectively aligned with said first and second rollers.

6. The apparatus of claim 1 including first and second flange means adjacent the ends of said capstan means and extending radially beyond said tape support surface means, and spring means urging said first flange means toward said second flange means.

7. The apparatus of claim 6 wherein said arm means have portions near said arcuate surfaces which overlie said flange means.

8. The apparatus of claim 7 wherein said roller means hold said arcuate surfaces displaced from said capstan means by a distance corresponding substantially to the thickness of the tape when said roller means are engaged with the tape and are holding it against the capstan means.

* * * * *